Patented Mar. 6, 1923.

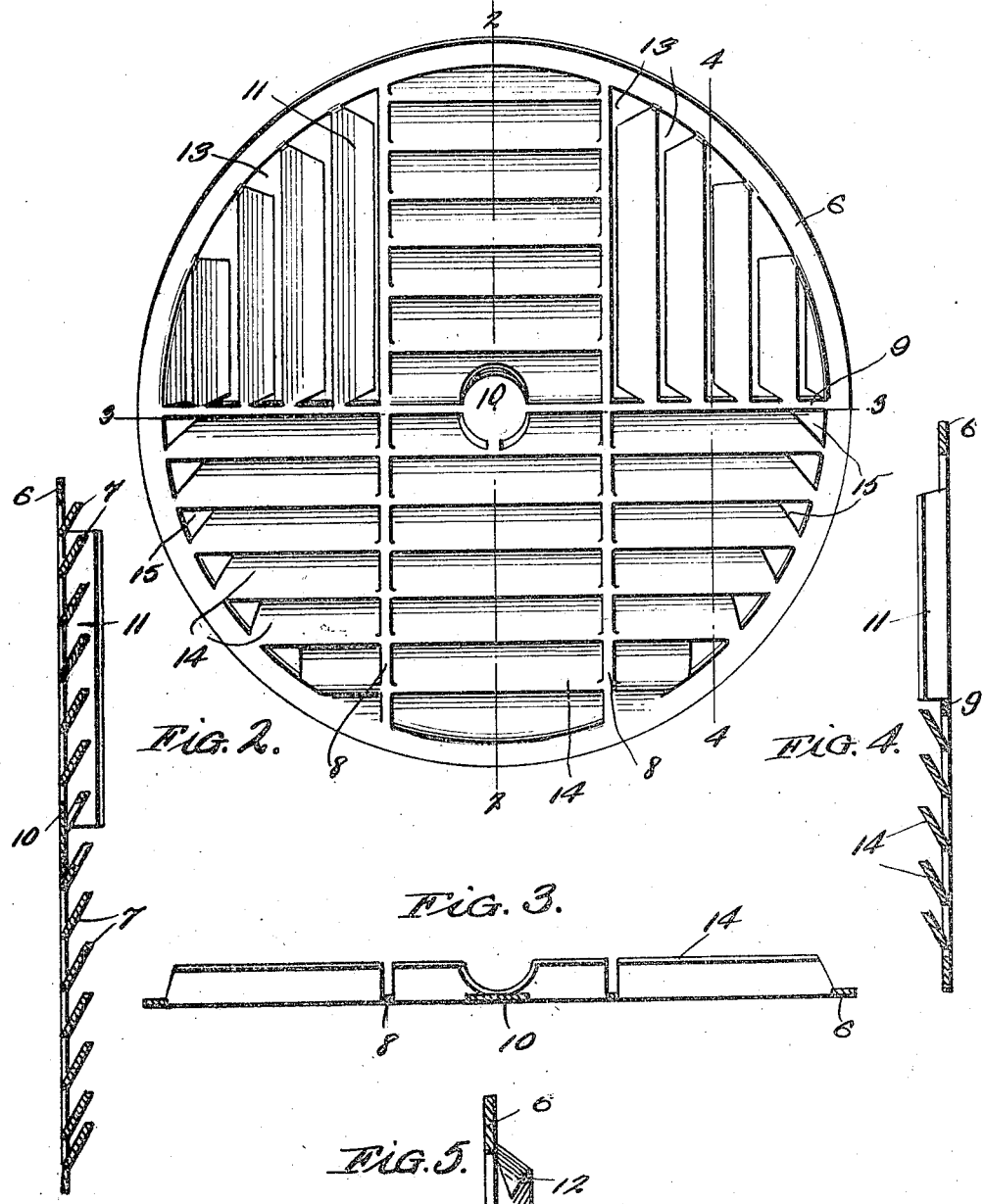

1,447,859

UNITED STATES PATENT OFFICE.

WILLIAM K. JOHNSON, OF ELDORADO, KANSAS.

ANTIGLARE ATTACHMENT FOR HEADLIGHTS.

Application filed September 19, 1921. Serial No. 501,663.

*To all whom it may concern:*

Be it known that I, WILLIAM K. JOHNSON, a citizen of the United States, residing at Eldorado, in the county of Butler and State of Kansas, have invented certain new and useful Improvements in Antiglare Attachments for Headlights, of which the following is a specification.

The present invention consists of an antiglare attachment for headlights and has for its objects the following:—

To provide an attachment which will positively prevent the emission of unobstructed or concentrated light rays repugnant to approaching motorists or pedestrians, at the same time affording ample illumination to distinguish the road of travel; to provide an attachment which may be quickly and conveniently applied to standard headlights; and to provide a device which may be stamped from metal or other suitable material at very low cost.

The above and other objects of this invention will be in part described and in part understood from the following description of the present preferred embodiment of the invention taken in connection with the accompanying drawings wherein:—

Fig. 1 is a front elevational view of an attachment constructed in accordance with this invention;

Fig. 2 is a vertical sectional view thereof taken on the line 2—2 of Fig. 1;

Fig. 3 is a horizontal sectional view taken on the line 3—3 of Fig. 1;

Fig. 4 is a vertical sectional view taken on the line 4—4 of Fig. 1; and

Fig. 5 is a detail enlarged fragmentary sectional view showing to advantage the manner in which a terminal of one of the louver flanges is bent inwardly.

The device of this invention consists of a disk 6 shown to be of a circular configuration although other contours may be used if desired in order to conform to the contour of the headlight. The disk may be made of metal, mica, or any other suitable material and may be of any desired thickness. The blank disk is stamped so as to provide a vertical series of upwardly inclined louver flanges 7 which extend diametrically across the disk between parallel bars 8. By preference these flanges are set at an angle of about 45° although this angle may be changed in order to conform to the candle power of the bulbs used, or other conditions which may make it necessary to increase or diminish the angular positions of these flanges. A bar 9 extends horizontally through the disk approximately midway between the top and the bottom of the latter and intersects the bars 8. The bar 9 supports a disk 10 which is stamped centrally in said disk 6 so as to lie directly in front of the bulb of the headlight.

The upper half of the disk, on both sides of the bars 8 has a plurality of vertically extending louver flanges 11 stamped therefrom. These flanges vary in length toward the periphery of the disk and have the outer upper corners 12 thereof folded inwardly to provide light openings 13. The lower half of the disk, on both sides of the bars 8 is stamped to provide series of horizontally extending upwardly inclined louver flanges 14. These flanges have portions of their outer ends folded in to provide light-emitting openings 15 adjacent the periphery of the disk.

It is apparent from the above that the lower half of the disk comprises vertical series of horizontally extending louver flanges to deflect the light rays downward. The upper half of the disk is provided with a second series of upwardly inclined horizontally extending louver flanges in order to deflect the light rays downwardly. However, this upper series of horizontally extending flanges is bordered on both sides by the vertically extending louver flanges 11, which latter deflect the light rays toward the upper flanges 7. In this way a complete light diffusing surface is provided to eliminate the emission of unobstructed or concentrated light rays since the only portions of the disk which are completely uncovered are the points 13 and 15 and these being in close proximity to the periphery of the headlight will emit only indirect light rays. The disk may of course be arranged in any desired manner within the headlight directly to the rear of the headlight lens. Its construction is simple and it may be conveniently mounted in the headlight.

Various changes may be made in this device especially in the details of construction, proportion and arrangement of parts within the scope of the appended claim.

What is claimed is:—

As a new article of manufacture, an antiglare attachment for headlights comprising a flat disk-shaped body, a horizontally disposed diammetrically extending bar carried by the body, a pair of spaced parallel vertically disposed bars extending across the disk on opposite sides of the axial center thereof and bisecting the horizontal bar, upwardly extending inclined flanges struck out in the disk below the horizontal bar and between and on each side of the vertical bars, and a plurality of inclined horizontally disposed struckout flanges formed in the disk above the horizontal bar intermediate the vertically disposed bars and vertically disposed struckout inclined flanges formed in the disk on opposite sides of the vertical bars above the horizontal bar.

In testimony whereof I affix my signature in presence of two witnesses.

WILLIAM K. JOHNSON.

Witnesses:
  BLANCHE E. MIZE,
  J. C. BOELLNER.